(12) United States Patent  
Gabara

(10) Patent No.: US 6,295,323 B1  
(45) Date of Patent: Sep. 25, 2001

(54) METHOD AND SYSTEM OF DATA TRANSMISSION USING DIFFERENTIAL AND COMMON MODE DATA SIGNALING

(75) Inventor: Thaddeus J. Gabara, Union, NJ (US)

(73) Assignee: Agere Systems Guardian Corp., Allentown, PA (US)

(*) Notice: Subject to any disclaimer, the term of this patent is extended or adjusted under 35 U.S.C. 154(b) by 0 days.

(21) Appl. No.: 09/221,264

(22) Filed: Dec. 28, 1998

(51) Int. Cl.[7] ....................................... H04B 3/50
(52) U.S. Cl. .................. 375/257; 375/259; 375/295; 375/316
(58) Field of Search .................. 375/244, 257, 375/259, 295, 316

(56) References Cited

U.S. PATENT DOCUMENTS

| | | | |
|---|---|---|---|
| 4,947,406 | 8/1990 | Yokoyama | 375/7 |
| 5,166,956 | 11/1992 | Baltus et al. | 375/17 |
| 5,862,180 | * 1/1999 | Heinz | 375/244 |

OTHER PUBLICATIONS

Bell Telephone Laboratories, "Transmission Systems for Communications", vol. 1., pp. 3–20–3–41 (undated).

Bell Telephone Laboratories, "Transmission Systems for Communication", Revised 4th Ed., Chp. 2 (undated).

R.B. Blackman, "Fundamental Circuit Theory", Sec. 6.7, pp. 6–24–6–31 (1955).

* cited by examiner

*Primary Examiner*—Amanda T. Le  
(74) *Attorney, Agent, or Firm*—Darby & Darby

(57) ABSTRACT

A system and method for transferring digital data using differential and common mode data signaling is disclosed. A first digital data signal is differentially transmitted using two differential signal components sent over a two-wire interface and switched between several different discrete signal levels. A common mode signal is carried across the differential pair and used to transmit a second digital data signal. The data output stage uses a common mode injection circuit to inject a common mode voltage or current equally onto both components of the differential interface. The data receiver has a common mode extraction circuit connected to the differential interface which extracts the injected common mode signal. Common mode data transmission can be in the same or opposite direction as the differential data transmission. Common mode signals may be injected in several layers and across two or more differential interfaces to increase the data content per interface line and to improve accuracy.

31 Claims, 12 Drawing Sheets

METHOD AND SYSTEM OF DATA TRANSMISSION USING DIFFERENTIAL AND COMMON MODE DATA SIGNALING

FIELD OF THE INVENTION

The present invention is directed to a method and apparatus for transmitting data. More particularly, this invention relates to a technique for increasing the data throughput on a differential data output.

BACKGROUND OF THE INVENTION

A key limitation in many data processing circuits is the number of data output signals which are available. This is especially true in the case of integrated circuits, where the number of circuit elements vastly outnumbers the available output pins. Accordingly, it is desirable to send as much data as possible between two points by using the minimum number of interconnects.

In a traditional "single-ended" data signaling method, a single data signal is sent over one data channel, such as a wire, by varying a signal attribute, such as current or voltage. For example, in a digital data transmission, sending a 0 volt signal may indicate a digital zero bit, while sending a 5 volt signal indicates a digital one bit. This conventional method of data signaling is adequate if the signal levels are widely spaced and well defined. However, power consumption by electronic devices has recently become a major issue. To address this concern, the supply voltages and the separation between different data levels have been significantly reduced. Separations in the range of only several hundred millivolts are not uncommon. Unfortunately, single-ended data transfers are relatively susceptible to noise and when signal swings are reduced, noise becomes a serious issue and even small amounts of interference can seriously degrade the reliability of the interface.

A conventional solution to line noise has been to use a differential mode of signaling. A single data signal is transmitted over two wires, each of which carries one signal component. The two components are generally derived from the same source data signal and are varied such that the data signal is transmitted as the difference between the signal level of the two signal component.

In digital environments, differential data signals are transmitted as two voltage signals of opposite polarity relative to a reference level (differential voltage signaling). The transmitted data is extracted by determining which signal component has a greater voltage. By changing the voltage polarity of the signal components, the desired data can be transmitted. Alternatively, current signaling may be used, in which a differential signal is represented as two current signals flowing in opposite directions on a closed loop. The direction of current flow indicates the polarity of the digital signal transmitted. By changing the relative polarity of the voltage signal components direction of current flow, the desired data may be transmitted.

Differential mode signaling provides for greatly improved noise immunity, lower power, as well as less noise generation and is therefore widely used to interconnect digital circuits on separate chips and circuit boards. However, a significant problem with differential signaling is that two wires are required to transmit one data signal. This is a particularly serious issue where integrated circuits are concerned because the number of input and output pins available is extremely limited. It is therefore desirable to increase the amount of data which can be transmitted over a digital data interface, while retaining the power and noise immunity advantages associated with two-wire differential signaling. It is also desirable to transmit additional information over a two-wire differential interface without decreasing the accuracy of the original differential mode signal and without increasing the number of interface wires required.

Differential signaling has also been used in the telecommunications environment, specifically in the context of two-wire "twisted-pair" audio communication. Transmitting and receiving circuits are coupled to the interface using transformers. In the context of audio communication over telephone cables, the coupling transformers have been center-tapped to allow an additional signal to be transmitted on the twisted pair. Two center-tapped circuits have been combined using transformers as shown in FIG. 1 to create a "phantom circuit." As shown, two analog signals are transmitted in a normal manner over each of the balanced pairs. A third analog signal is transmitted over the four wires through the center taps of the transformers. Provided that all four of the wires are precisely balanced, the first two signals are not affected by currents entering and leaving through the center taps of the transformer windings.

A significant drawback to this type of circuit is the limiting nature of the transformer coupling. Transformers are relatively narrow band-pass structures and the attributes of the transformers used in a specific application must be chosen according to a predetermined, and limited, input signal bandwidth. For standard telephony, this limit is 300 Hz to 3300 Hz. Signals with a frequency outside of the designed bandwidth are attenuated by the transformer interface and not passed by the system. Thus, while phantom circuits may be suitable for transmitting a third, limited bandwidth signal over two narrow band voice signals, transformer based circuits are unsuitable for broad-band or variable-band data communication. In particular, they are unsuitable for digital communication because the pseudo-random nature of digital signals results in signal frequencies which can range from zero Hertz, for a string of bits with the same polarity, to several giga-Hertz, depending on the data content. An additional drawback to this type of circuit arrangement is the difficulty of maintaining a balanced interface when more than a few twisted pairs are present. This is especially difficult because interface characteristics vary across the length of a telephone cable due to shifting in the relative position of one pair of wires with respect to others, and the tapping of various lines as additional subscribers are connected.

SUMMARY OF THE INVENTION

According to the invention, a two-wire data interface with an output stage including a broad band or all-pass differential switching structure is used to transmit digital data using differential signaling. The output stage includes a common mode injection circuit, such as a resistive network placed across the interface, which is used to inject a common-mode current or voltage onto the interface in a manner which affects the two differential signal components to substantially the same degree. Because the difference between the two signal components remains constant, the differential mode signal is unaltered. An input stage is provided to detect the differential signal and has an extraction circuit, which may be a second resistive network, to extract the transmitted common mode signal level. Alternatively, the common mode signal may be injected in a direction opposite to the differential data (i.e., the injection circuit is in the input stage and the extraction circuit is in the output stage).

Accordingly, two data wires are used to transmit a first digital data signal using differential signaling and to transmit a second common mode signal in the same or opposite direction as the differential signal. In a preferred embodiment, differential current signaling is accomplished with a current switch connected to the interface as the differential output driver and a switched current or voltage is applied as the common mode signal.

In a second embodiment of the invention, a third wire is provided on the data interface. The magnitude of a signal on the third wire is varied in a coordinated manner with the common mode signal injected on the differential pair. The common mode signal and the third-wire signal are used to differentially transmit a second data signal in the same or opposite direction as the first signal. In a variant of this embodiment, a "second" differential output stage or driver having common mode injections means is used to drive the third wire and the common-mode signal of the first output stage. A second common mode signal may also be injected through the second output stage. This arrangement allows two differential data signals to be transmitted over three interface wires as well as a third common-mode signal.

In yet a third embodiment of the invention, two differential data interfaces are provided for transmitting two binary data signals, in the same or opposite directions. Each interface has a common mode injection and extraction circut such that a common mode signal can be transmitted over each two-wire differential interface. The two common mode signals are used to differentially transmit a third binary data signal. Thus, four data wires may be used to transmit three differential signals. In addition, a common "common mode" signal voltage can be injected onto all four wires, allowing a further data signal to be carried as a single ended signal, thus increasing the data carrying capacity.

In a fourth embodiment, which is a modification of the third embodiment, the two injected common-mode signals are generated by a third output stage connected to the injection circuits in the two output stages driving the interface. The injected common mode signals are used to transmit a differential data signal as well as an additional common mode signal. In this embodiment, four output wires are used to transmit four data signals, three of which are differential data signals, the fourth being a single-ended common mode signal. As in the prior embodiments, the data flow may be in either direction. This is a significant improvement over conventional differential interfaces, where only two data signals are transmitted over four wires.

According to the invention, differential input and output stages having common-mode injection and extraction circuits may be combined in a wide variety of ways to increase the number of data signals transmitted over differential data pairs. As a result, the data throughput on a given number of differential two-wire interfaces can be increased to be equivalent to that of a single-ended data transfer (i.e., one bit per wire), while retaining the advantages of low power and high noise immunity of differential mode signaling.

BRIEF DESCRIPTION OF THE DRAWINGS

The foregoing and other features of the present invention will be more readily apparent from the following detailed description of the drawings of illustrative embodiments of the invention in which.

DETAILED DESCRIPTION OF THE PREFERRED EMBODIMENTS

Figure 2A:
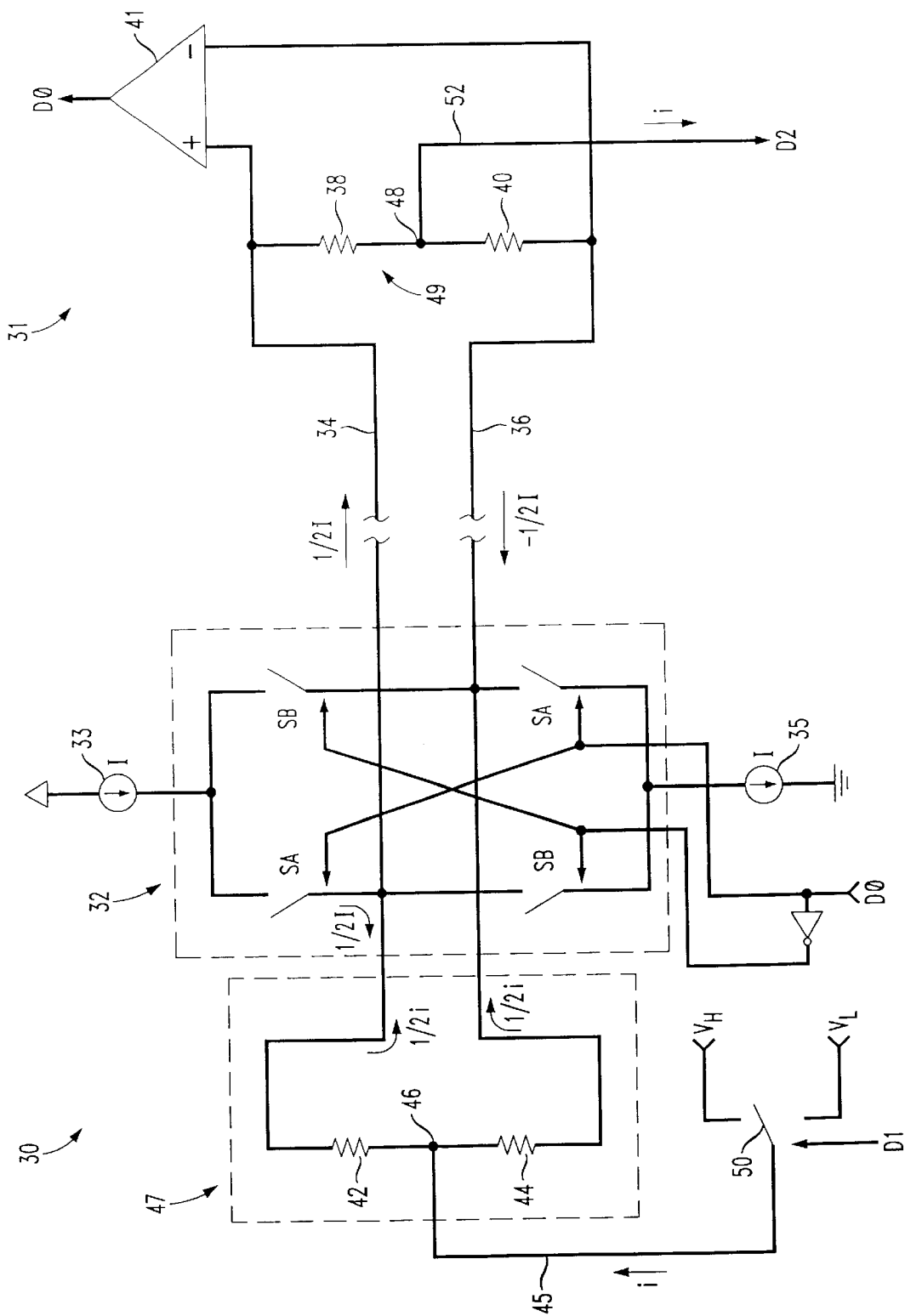
FIG. 2a is circuit diagram of a data interface according to the invention.

A circuit diagram of an all-pass digital data interface combining differential and common mode signaling according to the invention is shown in FIG. 2a. The interface has an output stage 30 and an input stage 31. The output stage 30 comprises a high-bandwidth, and preferably an all-pass, differential switching circuit 32 and a common mode injection circuit 47. The input stage 31 comprises a differential receiver 31 having a common-mode extraction circuit 49. In the circuits illustrated in the figures, conventional resistors are illustrated. However, it is understood that the resistance may be implemented using other resistive devices, such as appropriately baised MOS transistors, or a combination of passive and active components.

The switching circuit 32 supplies a pair of differential signal on the interface 34, 36 in response to a first digital data signal D0. The common mode injection circuit 47 provides a common mode signal according to a second digital data signal D1. The common mode signal is injected onto each differential signal in a manner which alters the differential signals by substantially the same degree. Because the difference between the differential signals remains substantially the same, the differentially transmitted data is unchanged. The injected common mode data signal D1 can then be separately extracted by the extraction circuit 49.

In the preferred embodiment, the differential switching circuit 32 is a current switch which supplies a current/from matched current source and sink 33, 35 through switch pairs SA, SB, wires 34, 36, and an attached load, here the input stage 31. Switches SA and SB can be operated in a complementary manner so that when one pair is open, the other is closed. The state of the switches controls the direction of current flow through the interface 34, 36. The current signal on the two wires forms a differential data signal. The direction of current flow is detected by a comparator 41 which measures the voltage drop across a resistance, such as resistors 38, 40. The polarity of the measured voltage drop indicates the polarity of the data bit transmitted. Here, the state of the switches SA, SB are controlled by digital data bit D0, such that, for example, when D0 is high, switches SA are closed while switches SB are open.

Alternatively, differential voltage switching may be used, in which case one of two different voltage levels is applied to each wire 34, 36. The applied voltages are selected by complementary switches driven by, e.g., data bit D0. The value of D0 is determined by measuring the voltage difference between the two wires to determine, for example, which wire has a higher voltage. Because continuous current does not need to flow through the interface to transmit voltage levels, interface wires 34, 36 do not need to form a closed loop, as required in a current signaling scheme. Voltage signaling is discussed in further detail below.

A common-mode injection circuit 47 is provided to inject a common mode voltage or current into the interface 34, 36. In the preferred embodiment, the injection circuit 47 is comprised of two resistors 42 and 44 placed in series across the interface 34, 36. A current or voltage is injected between the resistors 42, 44 at node 46. A common-mode extraction circuit 49 is provided at the opposite end of the interface, and here is comprised of resistors 38 and 40 placed in series across the interface 34, 36. The injected common-mode signal is extracted from between resistors 38, 40 at node 48. In the embodiment shown in FIG. 2a, the injection circuit 47 is in the output stage 30 and the extraction circuit 49 is in the input stage 31. However, the position of the injection and extraction circuits 47, 49 may be switched so that the common-mode data flow is in the opposite direction than the differential mode data flow.

As illustrated, when switch pair SA is closed and SB is open, a portion of the current/from the current source 33 flows through wire 34, the extraction resistors 38 and 40 in the receiving input stage 31, and then back through wire 36 to the output stage 30. The remainder of the current flows through injection circuit resistors 42, 44. Preferably, the magnitudes of resistors 38, 40, 42, and 44 are chosen relative to the impedance of the interface to provide a balanced circuit in which half of the current/flows through the interface and half flows through the injection circuit. Reversing the state of the switches SA, SB reverses the direction of the current flow. The polarity of the voltage drop across the resistors 38 and 40 is detected, e.g., by a comparator 41, to determine the direction of current flow, and thus the value of the first transmitted data signal D0.

According to the invention, a common mode data signal, which may be a current or a voltage, is injected onto the interface 34, 36 through the injection circuit 47 at node 46. The circuit is configured such that the injected signal is distributed substantially equally over the two interface lines 34, 36, and therefore does not affect the underlying differential signal. The injected common mode signal is extracted at node 48 in the extraction circuit 49.

For common mode voltage signaling, a common-mode voltage signal representing a second binary data signal, D1, is preferably injected by a switch 50 controlled by signal D1 which selects one of two different voltage levels, $V_H$ and $V_L$. The magnitude of the injected voltage indicates the value of D1. Because the current source 33 and current sink 35 are matched and support only a total current l, no additional current may be sourced or sunk through them. Therefore, if any current i is injected at node 46, it will flow through wires 34 and 36 and the signal can be removed from the system at node 48 through signal 52. If substantially no current is drawn from node 48, as would occur if the extracted signal 52 is applied to a very high impedance device, such as an operational amplifier, the current will be reflected back to the source analogously to the well known reflection effect in source terminal line drivers and only the common mode voltage signal will be transferred.

Although the resistance of resistors 38, 40, 42, and 44 may be set to various relative values according to system and design requirements, preferably, the resistance of resistors 38, 40, 42, and 44 are equal so that any current which is injected, either deliberately, or due to inherent capacitances of the system, will flow evenly through both signal paths and thus affect the current in the differential signal components on wires 34 and 36 equally. Most preferably, the magnitudes of resistors 38, 40, 42, and 44 are equivalent and chosen to provide a balanced impedance.

In a balanced circuit, a current i injected at node 46 and extracted at node 48 will flow equally through both wires 34, 36 in the interface, such that, when switch pair SA is closed, a current of 0.5l +0.5i flows in wire 34 and −0.5l+0.5i flows in wire 36. Because both differential signal components are affected equally, the differential current flow is unaffected. In a common mode current signaling arrangement, the magnitude of the injected current i is varied according to D1.

It can be appreciated that any type of digital data may be transmitted using common mode data signaling. Thus, the digital data signal driving D1 can include timing or control data, such as clock signals, enables, etc. In addition, the common mode data D1 may be synchronized with differential data D0 or be switched independently.

In the circuit shown in FIG. 2a, the output D1 on line 52 has the attributes of a single-ended data transmission, as opposed to a differential transmission, because the value of D1 generally depends on the absolute magnitude of the common-mode injected current. Because single-ended data transmission are relatively susceptible to noise, a low-pass RC filter (not shown) can be used to smooth out the signal if desired.

Although the interface disclosed in FIG. 2a may be formed of discrete components, preferably, it is formed in an integrated circuit ("IC") and used for input and output from the IC to connect separate integrated circuits. The circuit is preferably fabricated using CMOS technology, but any suitable device type, such as bipolar transistors, may be used. In the IC configuration, the output stage 30 could be fabricated on one chip and the input stage 31 on a second chip. Alternatively, both parts of the circuit may be included on a single IC and used to connect various circuit elements on the IC, in which case differential voltage signaling is preferably used. In another arrangement, an input and output buffer according to the invention can be used to connect separate ICs through wires on a printed circuit board, a backplane, or in a cable. The data interface 34, 36 is preferably formed of balanced transmission lines. The impedance of the transmission lines and input and output stage resistances SS, 40, 42, 44 are chosen to provide appropriately matched input and output impedances.

Figure 1:
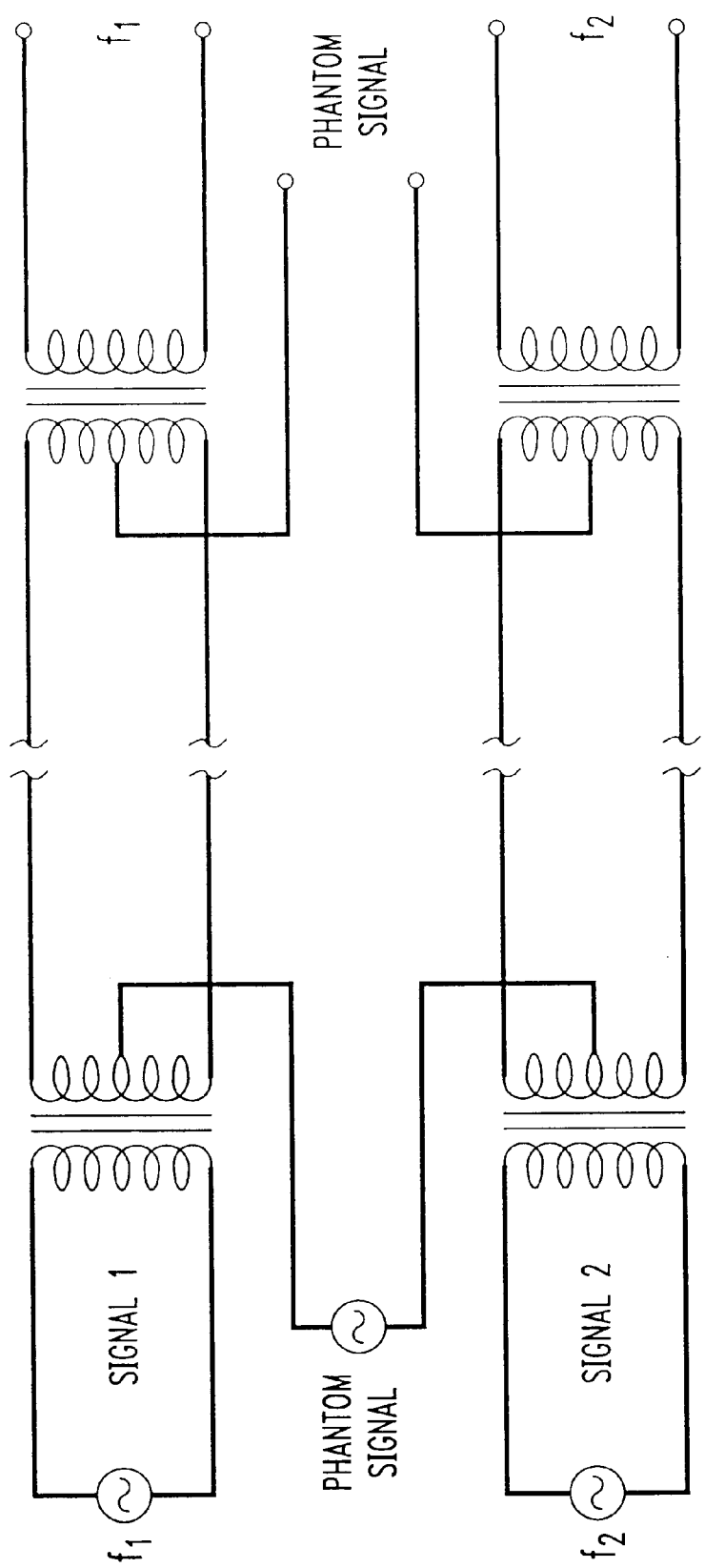
FIG. 1 is a transformer based phantom circuit used in telephony applications.

Unlike prior art transformer-based phantom circuits, such as shown in FIG. 1, a switching interface according to the present invention it well suited to high speed synchronous or asynchronous digital communications. The analog transformer coupling relied on in phantom circuits significantly limits the bandwidth of the circuit. In contrast, the current switching arrangement with common-mode injection supports a signaling frequency from D.C. to the maximum switching speed supported by the circuit, which may be up to several GHz. The use of injected common mode signaling allows a second data signal to be transmitted in either direction over the differential interface without interfering with the differential signal. This arrangement provides for increased data throughput without sacrificing the basic differential signal path.

Figure 2B:
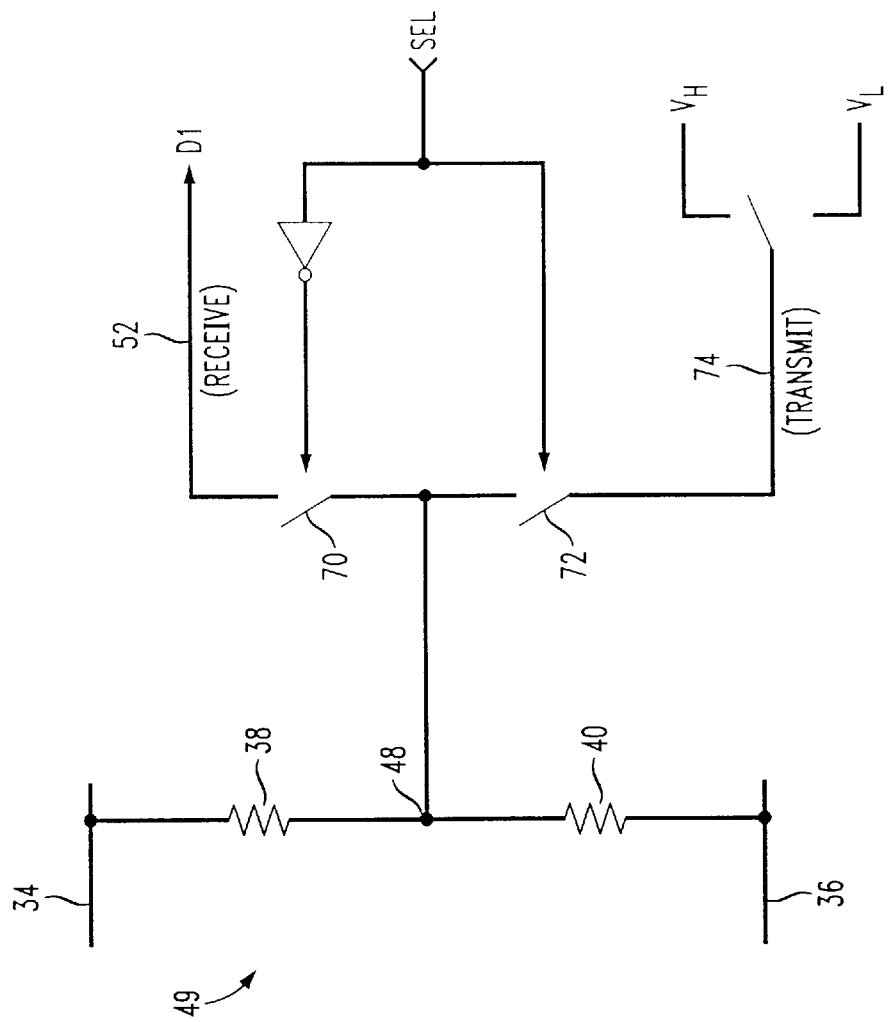
FIG. 2b is a portion of the data interface of FIG. 2a including a bi-directional common-mode signaling arrangement.

Because the direction of the common mode data signal flow is independent of the differential data flow, mechanisms may be provided to dynamically vary the direction of common-mode data flow according to various system requirements. For example, FIG. 2b shows a circuit diagram of the extraction circuit 49 shown in FIG. 2a, further including a bidirectional switching mechanism. A complimentary pair of switches 70, 72 connects node 48 to either a common mode receiving signal 52, as in FIG. 2a, or a common mode injection signal, such as $V_H$ and $V_L$, carried on signal 74. A similar circuit is provided for the injection circuit 47, only operated in a complementary manner. This arrangement provides for a unidirectional differential data interface with a bi-directional injected common mode signaling. Conventional hand-shaking techniques may be used to control logic circuits for switching the direction of the common mode data flow, for example, in response to system load, or to accommodate bursts of high volume data traffic. In some applications, it is advantageous to be able to monitor common mode data as it is transmitted. To accomplish this, switch 70 may be eliminated and the outgoing data monitored at all times via receiving signal 52.

Figure 2C:
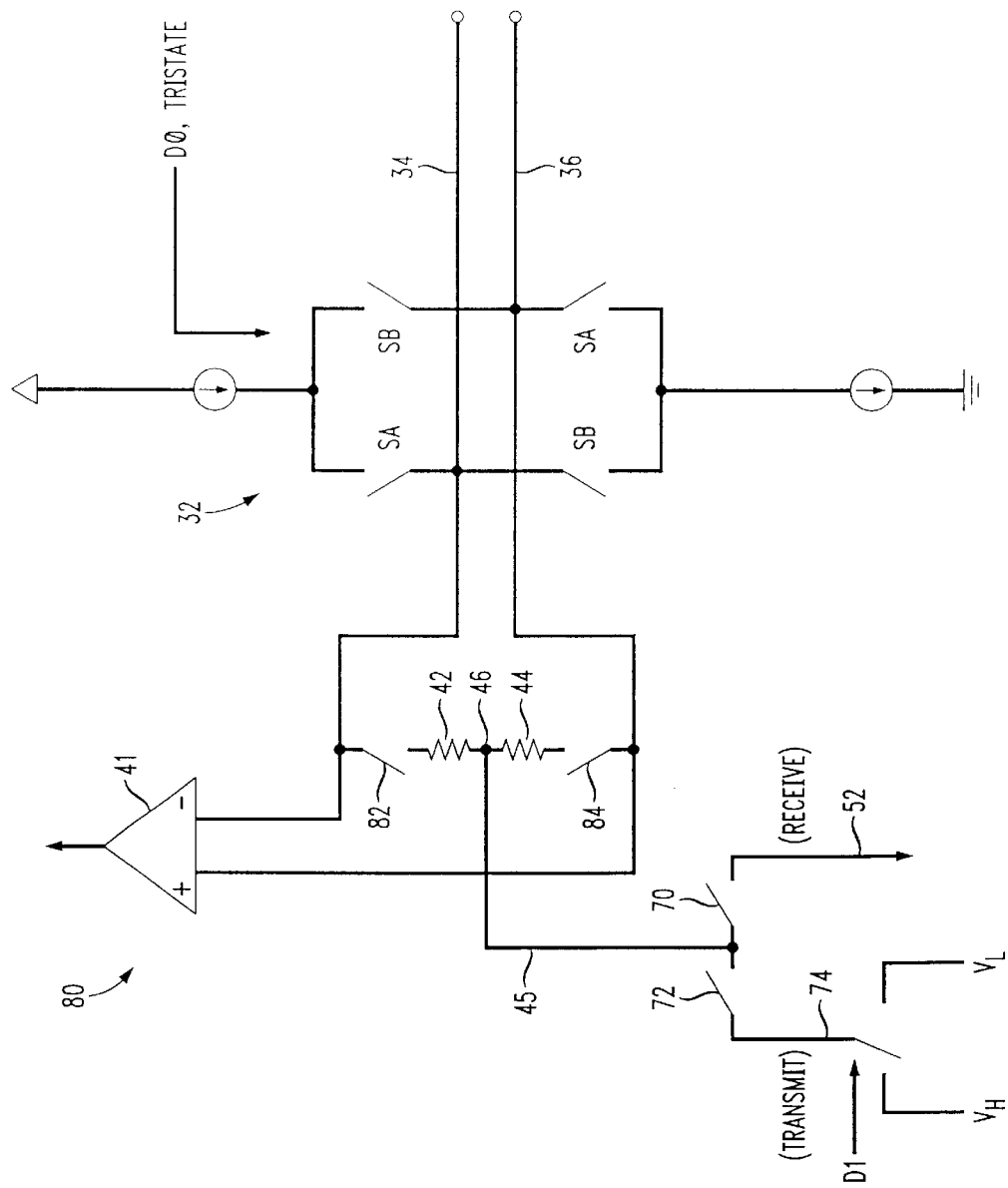
FIG. 2c is a circuit diagram of a bi-directional differential and common mode switching interface buffer.

According to a further aspect of the invention, the circuits of FIG. 2a and 2b may be combined into a single data transceiver unit 80, shown in FIG. 2c, which can send and receive both differential and common mode signals. The unit 80 comprises a current switch 32, as in FIG. 2a. The switch pairs SA and SB in current switch 32 may be driven from data D0, as shown in FIG. 2a, and also placed in a tri-state configuration, during which switch pairs SA and SB are both open. When the current switch 32 is tri-stated in this manner, it is effectively disconnected from the interface. A series pair of resistors 42, 44 with central node 48 are connected to the current switch as in FIG. 2a. Optionally, one or more switches 82, 84 may be connected in series with resistors 42, 44 to allow the load resistors to be disconnected from the interface 34, 36 when desired, for example, in a multi-port bus configuration, such as discussed below.

In addition, comparator 41, part of the input stage in FIG. 2a, is connected across the resistors 42, 44. Finally, a bi-directional common mode injection and extraction arrangement, as in FIG. 2b, is connected to node 46 as shown.

To transmit differential current signals, current switch 32 is controlled by input D0 as discussed above. Switches 82 and 84 are closed if needed to provide a load resistance 42, 44. To receive differential current signals, the current switch 32 is tri-stated and comparator 41 is used to detect the differential current signal across the resistors 42, 44. To inject common mode signals, resistors 42, 44 are connected across the network, switch 72 is closed, and the common mode voltage is injected at node 46 according to the value of D1, as described above. To receive a common mode signal, using this circuit, switch 70 is closed and the common mode signal is extracted via line 52, as described with regard to FIG. 2b.

Figure 2D:
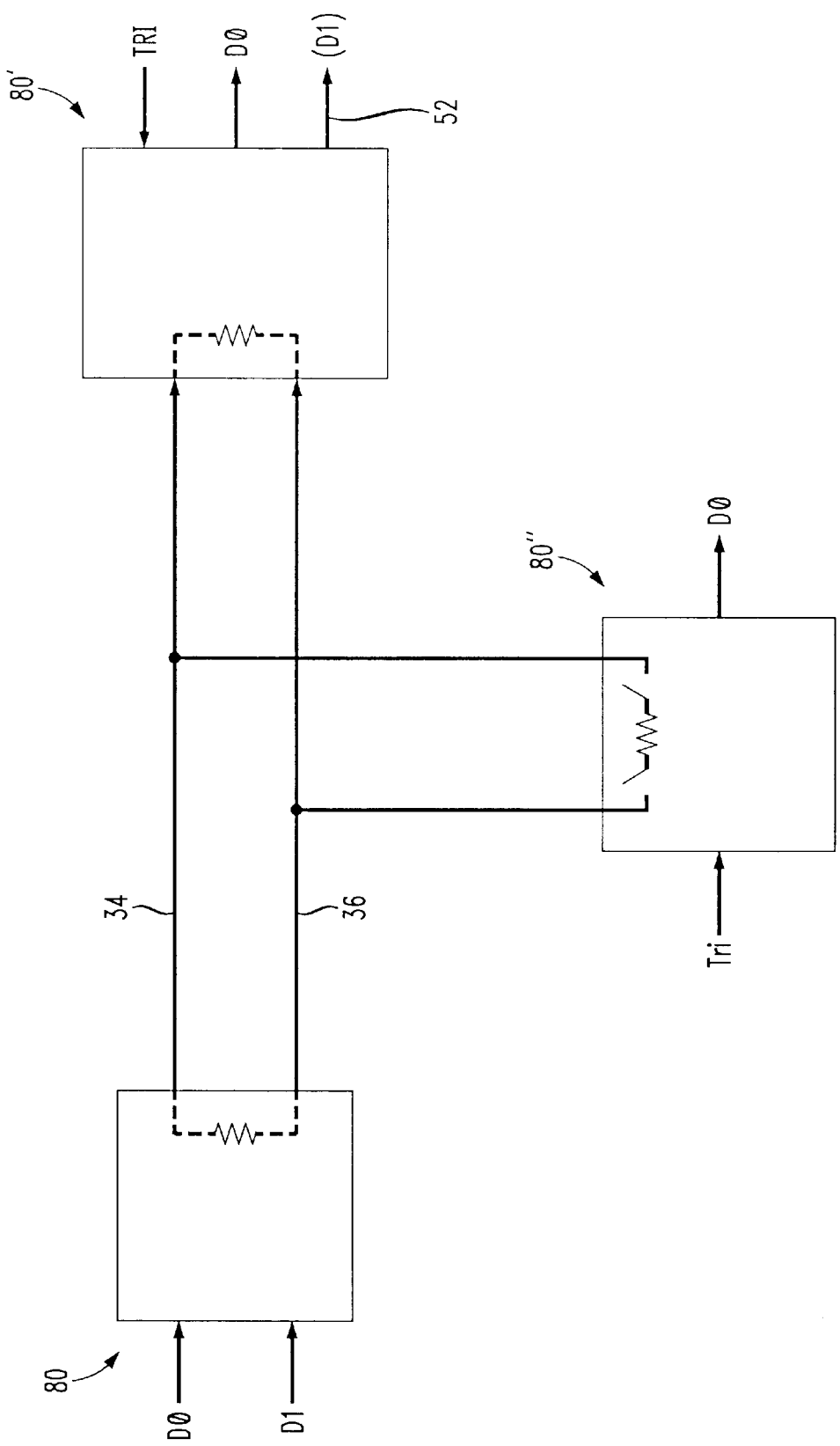
FIG. 2d is a block diagram of a multi-port bus using the bi-directional interface of FIG. 2c.

Because unit 80 is both bi-directional and selectively connectable, several units may be connected to form a multi-port bus as shown in FIG. 2d. Unit 80 is configured as a transmitting unit and unit 80' as a receiving unit. As indicated, the load resistors 42, 44 are connected in both units 80, 80'. In addition, unit 80" is also connected to the common bus. Because units 80 and 80' are both providing a load resistance on the interface, unit 80" can monitor the differential signal D0 by tri-stating the current switch, disconnecting the resistors 42, 44, and observing the output of comparator 41.

Figure 2E:
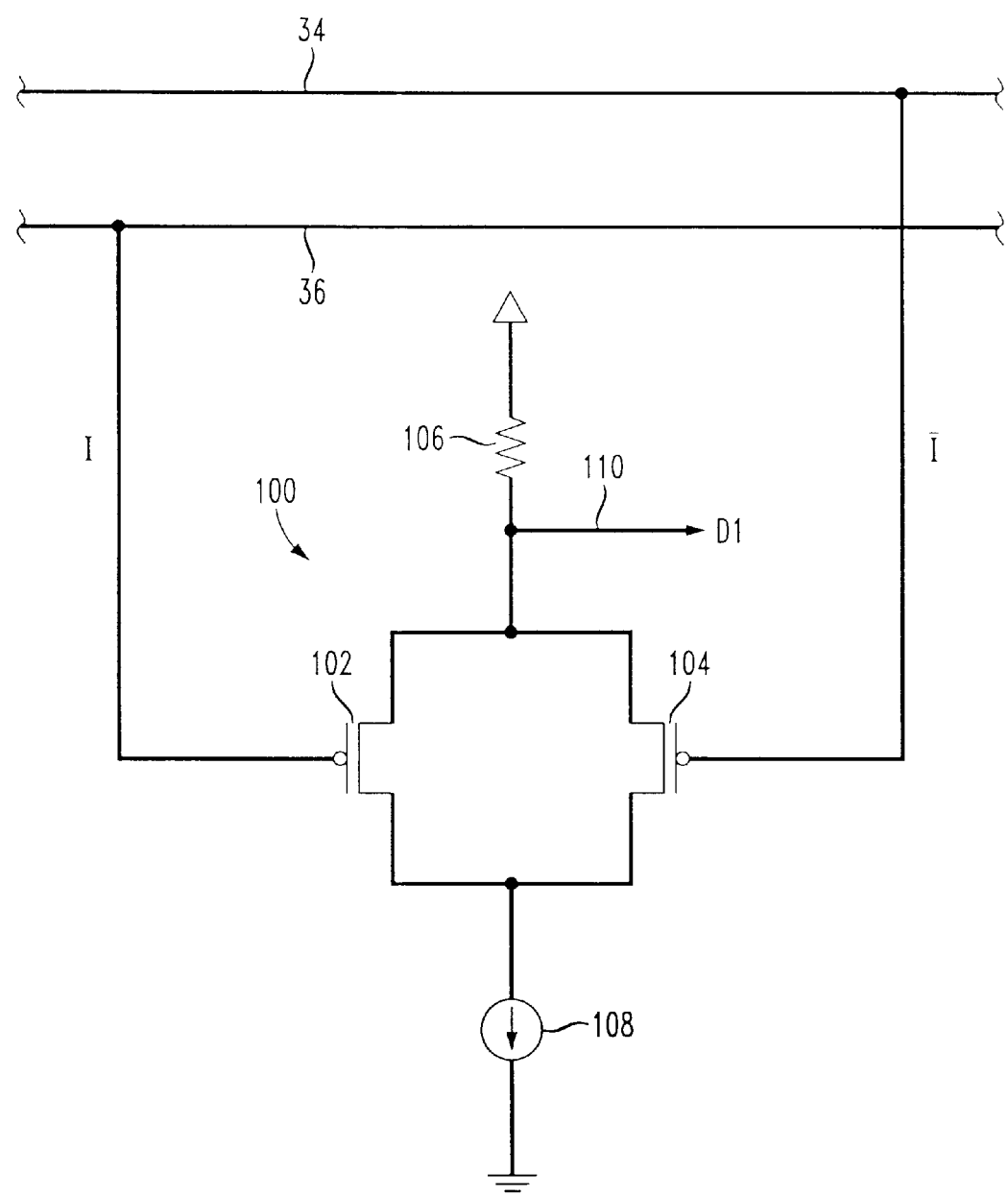
FIG. 2e is a circuit diagram of a basic receiver for common mode signals transmitted on a differential interface.

It can be appreciated, that in this particular configuration, unit 80" cannot monitor the common mode signal without connecting the resistors 42, 44 to the interface, since they provide a common mode extraction point. In some circumstances, it is preferable to be able to "listen" to the injected common mode voltage signals without having to draw an appreciable amount of current, in order not to upset the current levels on the interface. A receiver 100 meeting this requirement is illustrated in FIG. 2e. Receiver 100 is described in a copending U.S. Patent Application entitled "Receiver for Common Mode Signals Transmitted on a Differential Interface", filed on the same day as the present application, the entire contents of which is incorporated herein by reference.

Briefly, receiver 100 comprises a modified differential amplifier, having transistors 102, 104 connected in parallel between a resistive load 106 and a current driver 108. The transistors 102, 104 are driven with the differential voltages on the interface 34, 36, which voltages are generated by the differential current signals from, e.g., buffer unit 80. In this configuration, the output voltage 110, which is dependent on the total impedance of the transistors 102, 104, is substantially proportional to the common voltage appearing on the interface, and therefore can be used to determine the injected common mode data D1.

Although differential current signaling with injected common mode voltage is discussed above as a preferred embodiment, other arrangements are possible. In particular, differential voltage signaling may be used, where the relative voltage difference between the two differential signal components indicates the transmitted data bits and the sum, average, or other appropriate combination of the differential signals indicates the common mode signal.

For example, two wires carrying $V_H$ and $V_L$, respectively, may indicate a logic high, while switching the voltages to $V_L$ and $V_H$ indicates a logic low. In both instances, a common mode value would be, for example, $(V_L+V_H)/2$. A common-mode voltage signal is injected by level shifting both of the differential components by the same amount. For example, to inject a common-mode voltage $V_C$, the differential components would be shifted to $V_H+V_C$ and $V_L+V_C$. The transmitted differential signal can be extracted by applying the differential signal components to a comparator and determining which component has the greater voltage. The common mode signal level is extracted by applying the differential components to a summing or averaging type of circuit. Various types of voltage level-shifting input circuit and voltage combining output circuits may be used. Discrete level shifting and combining circuits are well known to those skilled in the art.

Figure 3:
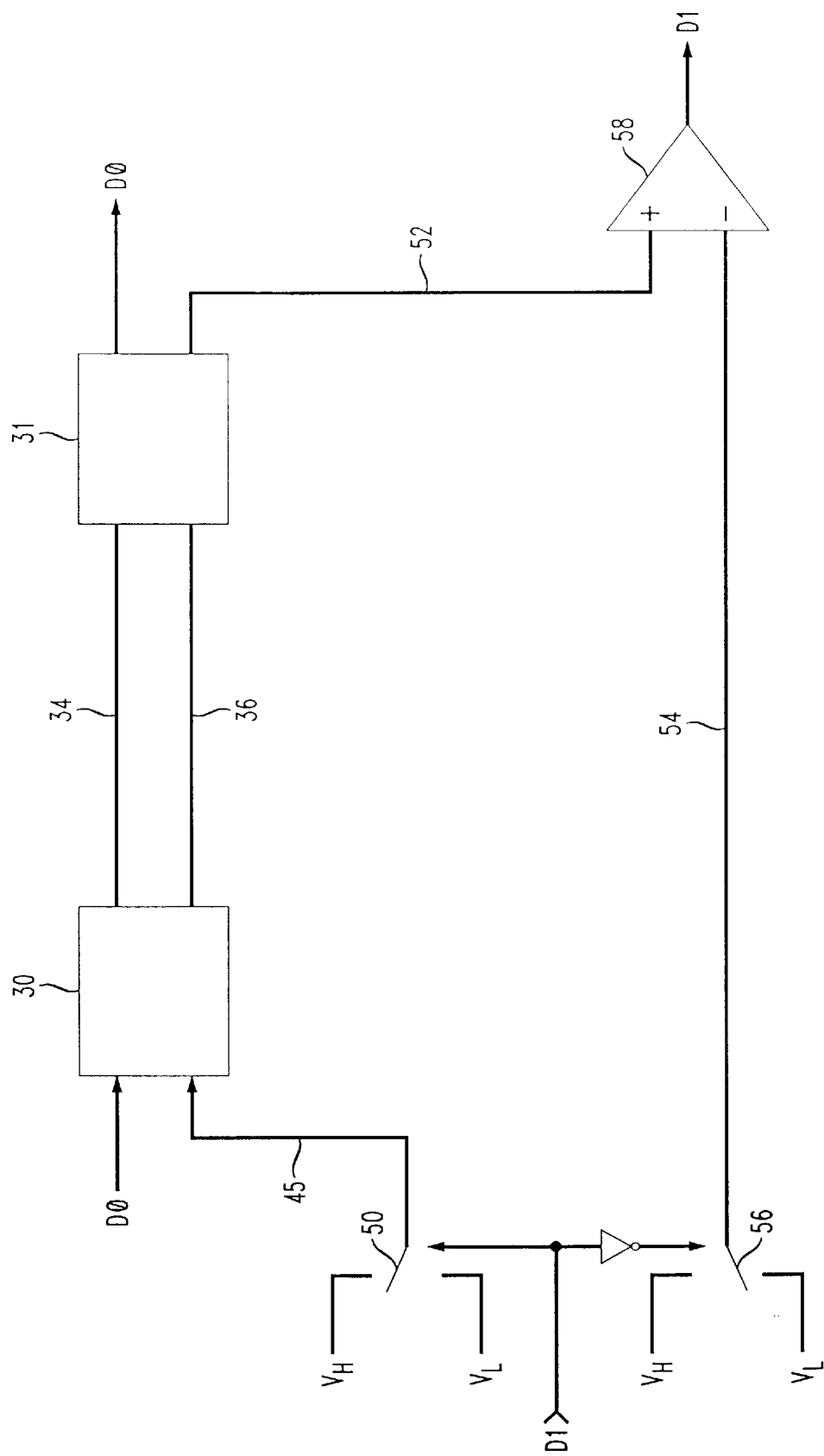
FIG. 3 is a block diagram of a three-wire data interface according to a second embodiment of the invention.

Turning now to FIG. 3, there is shown an alternate embodiment of the invention. The output stage 30 and input stage 31 are configured as shown in FIG. 2a. A third interface wire 54 is provided and connected to either $V_H$ and $V_L$ through a switch 56. Switches 50 and 56, controlling the voltage on signals 45 and 54 respectively, are controlled by a second binary data signal D1 in a complementary manner so that the voltage signals 45 and 54 differentially represent the value of D1. In other words, one differential component of D1 is injected as a common-mode signal over interface 34, 36, and the other component is carried over the third wire 54. The common mode signal component is extracted in input stage 31 and used, in conjunction with the voltage on line 54, to determine the transmitted value of D1. Preferably, this is accomplished by applying the two differential voltage components of D1 to the inputs of a comparator 58.

Figure 4:
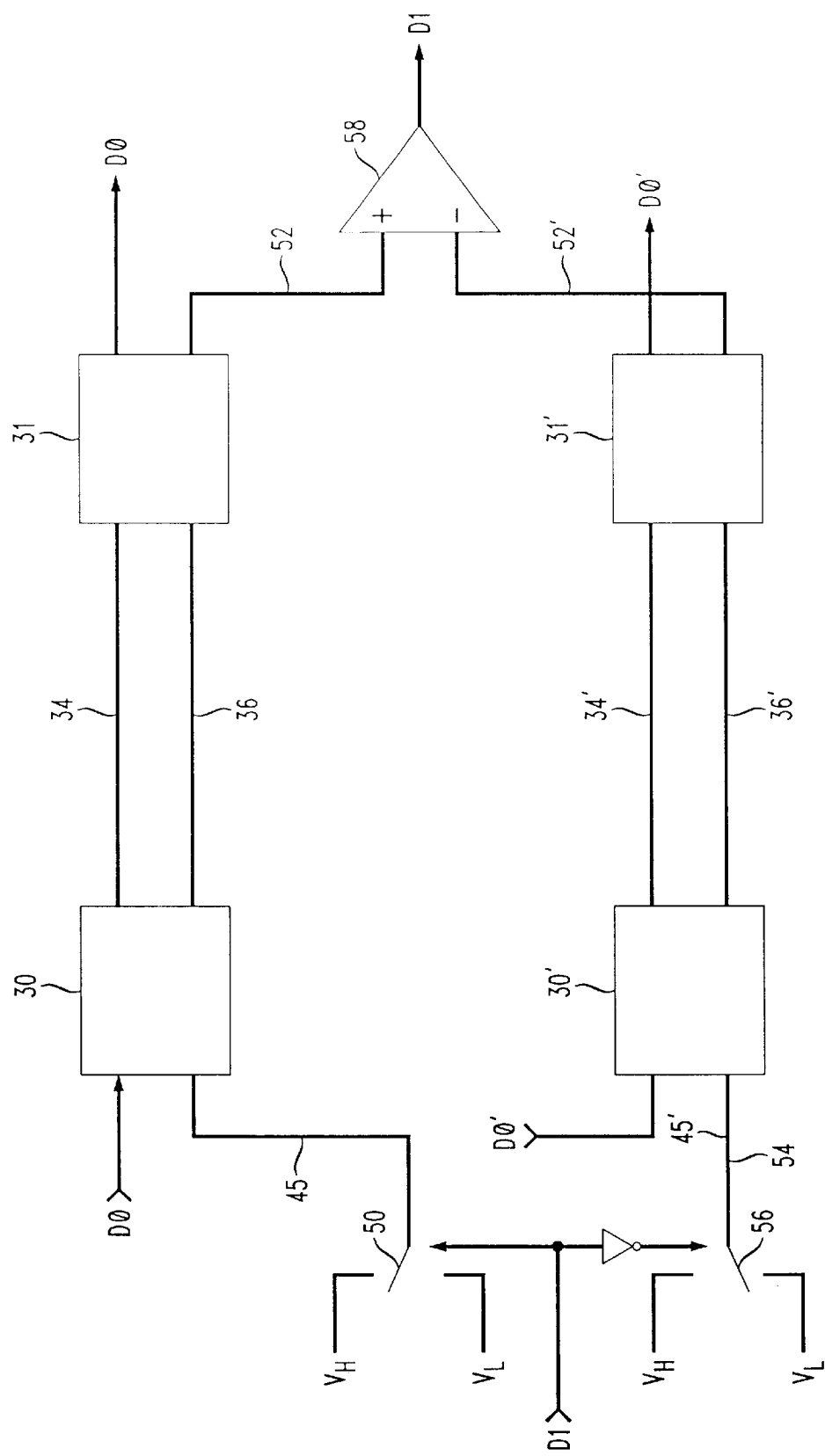
FIG. 4 is a block diagram of a four-wire data interface according to a third embodiment of the invention.

Yet another embodiment of the invention is illustrated in FIG. 4. This embodiment is similar to that shown in FIG. 3.

However, instead of relying on a separate wire 54 to carry one of the D1 differential components, the voltage is carried as an injected common mode signal in a differential signal carried 60 two additional wires. The top portion of the circuit, comprising output stage 30 and input stage 31 connected by wires 34 and 36, and transmitting data signal D0 and the common mode data input on signal 45 and output on signal 52, is the same as in FIG. 3.

In the bottom portion, the augmenting data wire 54 is not used as an interface wire itself, but instead feeds a common-mode injection signal into output stage 30'(and is therefore also shown as signal 45'). Output stage 30' transmits a differential data signal D0' over a two-wire interface 34', 36' to an input stage 31', where the differential data is extracted in the manner discussed above. In addition, the common mode signal input on signal 54 is transmitted and extracted by the extraction circuit 31' as common mode output 52'. The piggybacked differential data signal D1 transmitted by the two injected common mode signals is retrieved by applying the common mode signals 52, 52' to the inputs of comparator 58. In this arrangement, three differential data signals may be sent over two differential pairs. Two of the data signals are differential current signaled, and the third is a differential voltage signal carried as common mode voltages injected into the differential pairs. This arrangement, as well as the one in FIG. 3, represents common-mode voltage signaling because substantially no current is drawn by comparator 58 and any current which is injected will be reflected back towards the source.

According to yet a further aspect of the invention, the circuit shown in FIG. 4 may be modified to allow the transmission of a single-ended common mode signal in addition to the common-mode borne differential signal by using the two common mode signals transmitted over the differential pairs to carry another common mode signal, the magnitude of which represents a fourth data value. In one arrangement, this additional common mode signal is generated by concurrently changing the value of the injected voltages $V_H$ and $V_L$ by the same amount. Because the difference between the two voltage levels is not altered, the differential signal remains constant. The transmitted magnitude of the differential signal may be determined by applying the extracted voltage signals to an averaging circuit.

Figure 5:
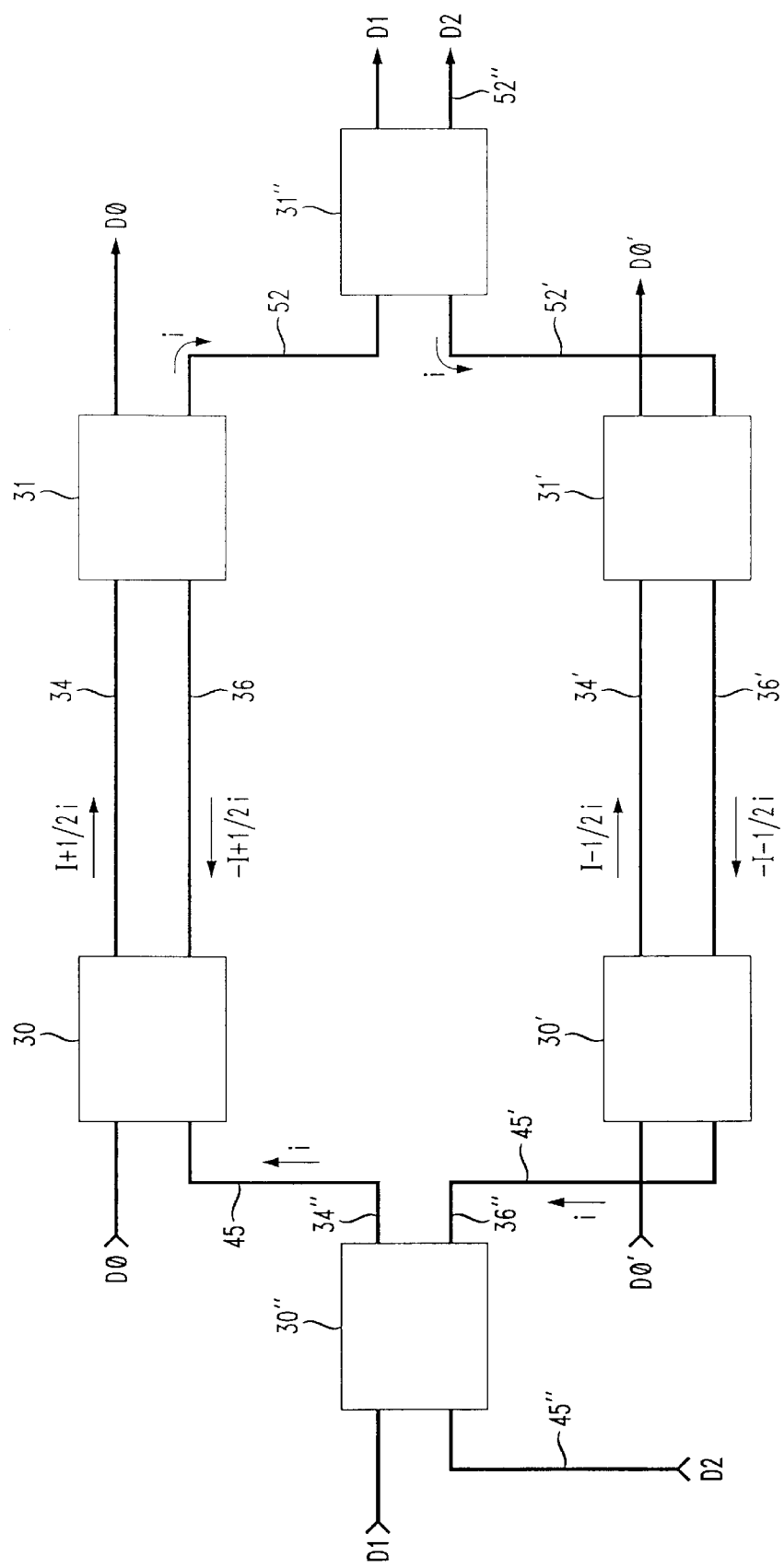
FIG. 5 is a block diagram of a four-wire data interface according to a fourth embodiment of the invention.

In the preferred embodiment of this arrangement, shown in FIG. 5, common mode current signaling, rather than voltage signaling, is used. Current signaling has the advantage that the differential current signaling stages 30, 31 may be easily connected to each other in a manner which is highly regular, an advantage for circuit design. Each of the differential interfaces are configured as shown in FIG. 2a. Output stage 30" is configured to receive data signal D1 and transmit it as a differential current signal over wires 34" and 36". These wires are each connected to the common-mode injection input 45, 45' of output stages 30, 30' as illustrated.

As discussed above, because the current sources and sinks in the output drivers 30, 30' fix the amount of current sourced and sunk, the additional current from output stage 30" which is injected into output stages 30 and 30' is distributed across wires 34 and 36 in the form of a common mode current signal. This signal is extracted at the input stage 31 and provided on signal 52. Similarly, the differential signal component of current on signal 36" is applied through output stage 30' and the interface wires 34', 36' to input stage 31', where it is extracted on signal 52'. The injected current cannot flow back into any of the current sinks and so is extracted as current mode differential signal components 52, 52', which are applied to input stage 31" where they are used to reproduce the transmitted data signal D1.

A fourth common mode voltage data signal D2 is transmitted by applying a voltage to signal 45", such as $V_H$ and $V_L$. The common mode voltage is transmitted across the data interface lines 34, 36, 34', and 36' and extracted as signal 52" in the input stage 31" in a manner similar to that discussed above. This arrangement therefore provides for three data signals to be transmitted using differential current mode signaling over two pairs of wires and a fourth data signal to be transmitted using common mode voltage signaling.

The configuration shown in FIG. 5 is also suitable for the multi-port bus configuration discussed with respect to FIGS. 2c–2e, above. Rather than using separate input and output stages, bi-directional units 80 may be concatenated into the "tree" input/output arrangement similar to the arrangement shown in FIG. 5. The assembly of units 80 connected to the "side" of the interface connects to the four-wire interface in a manner analogous to that shown in FIG. 2d.

Various other forms of the data output network shown in FIG. 5 may be implemented. In one particular embodiment, a byte-wide data interface with a clock is formed using three sets of the two-level networks of FIG. 5. Each two-level network supports three differentially signaled data bits. Thus, the combined network can transmit 8 data bits and, for example, a clock signal using differentially signaling over only six pairs of interface wires, as compared to the nine pairs which are necessary using conventional two-wire per-bit differential signaling. In addition, the byte-wide network according to the invention also provides for three common mode data bits which may be used to communicate various system protocols or control signals, in either direction, without needing additional signal interconnects.

Alternatively, several layers of common-mode injection differential interfaces may be combined in this manner. For example, two sets of two-level circuits such as shown in FIG. 5 may be provided, where the data inputs for D2 are provided by a third level differential output stage 31''', to thereby allow seven differential data bits to be sent over 4 pairs of wires with an additional common-mode data signal as well. In this manner, N-1 data bits may be transmitted using differential data signaling over N wires. For large number of bits, the differentially signaled data throughput approaches the data throughput of a conventional one-wire per bit interface while providing superior noise immunity and power characteristics.

Figure 6:
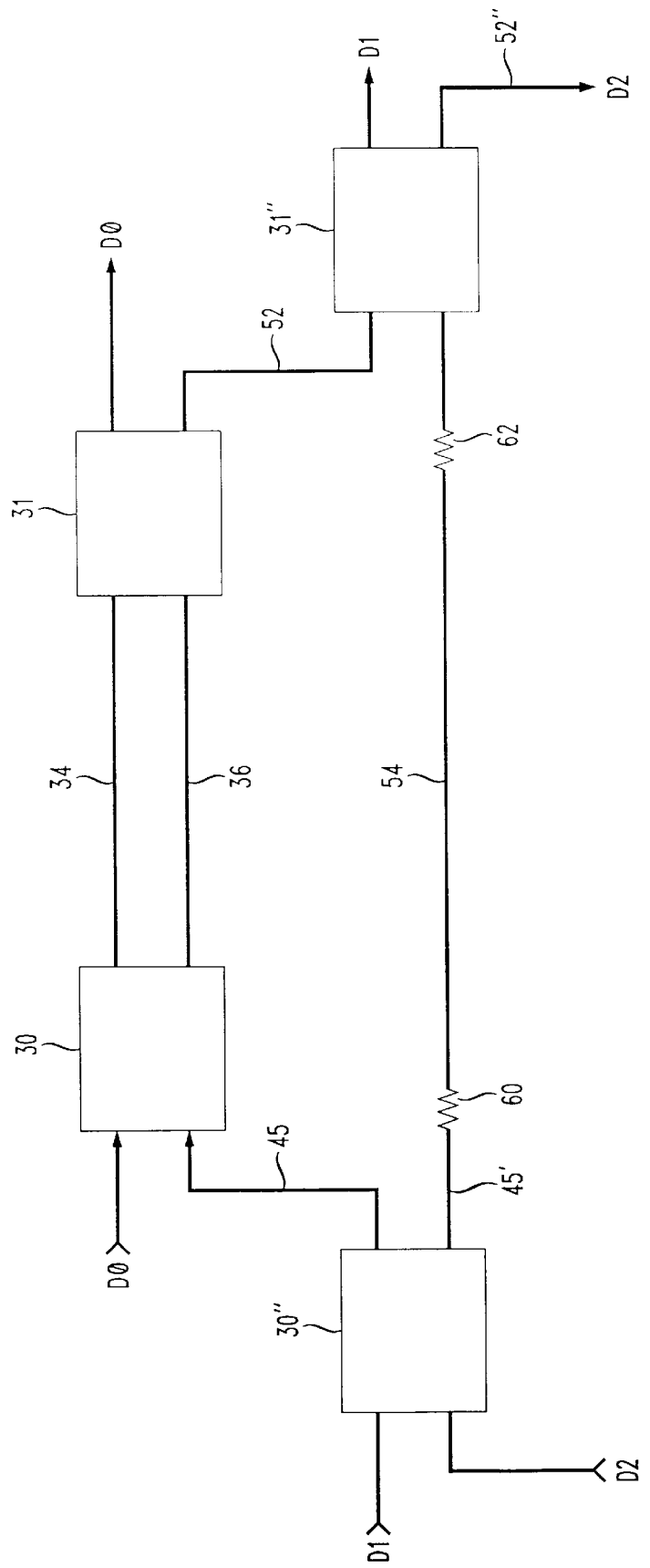
FIG. 6 is a block diagram of a hybrid three-wire interface according to yet another embodiment of the invention.

In a hybrid embodiment, shown in FIG. 6, three wires are used to transmit two differential signals and a common-mode signal. As shown, data D0 is transmitted differentially through output stage 30, differential pair 34, 36 and input stage 31, as discussed above. In addition, an injected common mode current signal 45 is carried on the pair 34, 36. The injected common mode signal is a differential signal component supplied by a second output stage 30". The other differential component 45' from output stage 30' is transmitted over a discrete third interface wire 54, similar to the arrangement of FIG. 3. An impedance, such as resistors 60 and 62, is added to line 54 to balance it with respect to the impedance seen by the first differential component 45 from stage 30". The output 52 from stage 31 and the current component on line 54 are processed by output stage 31" to yield differential data signal D1 and common mode voltage signal D2.

This hybrid arrangement provides a significant increase in data throughput when compared to conventional differential data interfaces. While a conventional differential interface requires two wires to transmit a single bit, and four wires to transmit two bits, the circuit of FIG. 6 supports two differentially transmitted data signals using only three wires, and, as an added advantage, supports a third common mode data signal.

According to a further aspect of the present invention, the effectiveness of the disclosed interfaces is enhanced by properly controlling the placement of the interface wires. Unlike telephonic applications, where the length and orientation of one pair of wires may vary significantly when compared to another due to variations in wire placement in the cable, line taps, etc., the placement of wires in an integrated circuit or on a printed circuit board or backplane is under absolute control of the designer. In a preferred embodiment, the placement and orientation of the balanced interface lines for the disclosed interface circuits are deliberately chosen to provide uniformity between common mode signals on different differential pairs. A constant displacement for the wires in the interface guarantees that the electrical characteristics of the wires remains substantially uniform, reducing the effect of noise on the differentially transmitted data.

This may be achieved by arranging the interface wires such that the midpoint of one pair of wires has a relatively constant displacement from a third wire or a second pair of wires. For example, with reference to Fig, 6, wires 34 and 36 may be arranged as parallel traces on one layer in an IC or printed wiring block. Wire 54 is then preferably placed equidistantly from both wires 34 and 36, where the distance between wire 54 and the midpoint of wires 34 and 36 can be adjusted to control the common mode impedance.

Figure 7:
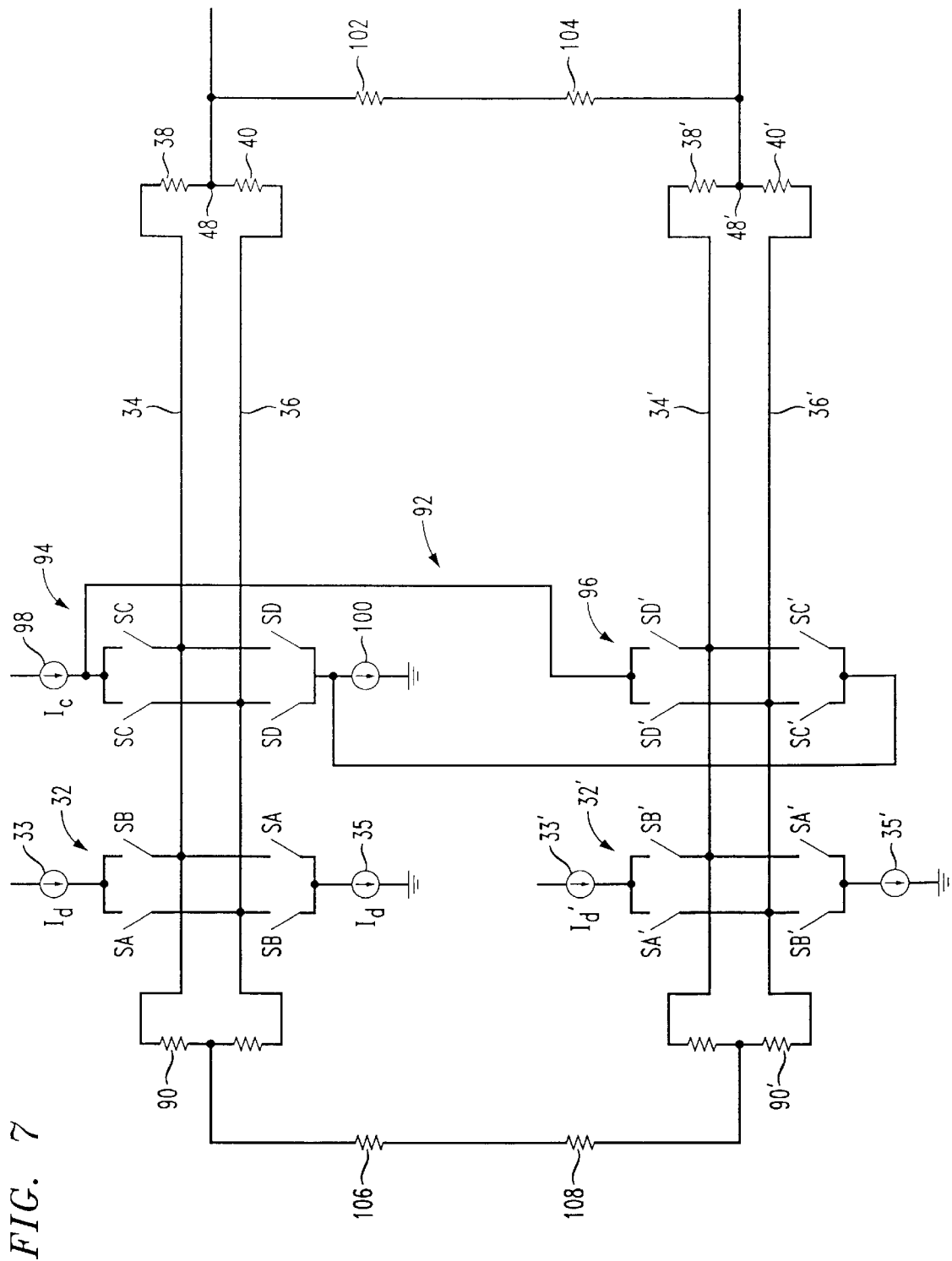
FIG. 7 is a circuit diagram of an alternative differential and common mode data transmitter according to the invention.

In the embodiments discussed above, the common mode signal was placed on the interface as a voltage through a common mode injection circuit 47. An alternative arrangement for data transmission using differential and common mode data signaling is shown in FIG. 7. In this arrangement, a common mode current signal is directly applied to and extracted from the interface in a manner which affects differentially transmitted data signal components equally.

Turning to FIG. 7, there is shown a differential switching circuit 32 connected to balanced interface wires 34 and 36. Similarly, differential switching circuit 32' is connected to interface wires 34' and 36'. The differential switching circuits 32 and 32' each transmit a data signal as two differential signal components in a manner discussed in detail above.

According to this aspect of the invention, a common mode current injection circuit 92 is provided to inject a common mode current directly into one interface 34, 36 and extract the common mode current from the other interface 34', 36'. As illustrated, injection circuit 92 comprises a first common mode current switch 94 and a second common mode current switch 96. The current switches 94, 96 are connected in parallel between a current source 98 supplying a current IC and a current sink 100 sinking a current IC.

Current switch 94 includes two pairs of switches SC, SD. Switches SC are used to selectively connect both of the interface wires 34, 36 to the current source 98 and switches SD are used to selectively connect both of the interface wires 34, 36 to the current sink 100. Thus, when switches SC are closed, current IC is applied to each of the wires 34, 36 in the interface. Because wires 34 and 36 are balanced, substantially equal amounts of current will be introduced into each wire, thus preserving the differential data signal transmitted by the differential current switch 32. As discussed above, because the current source and sink 33, 35 in the differential current switch 32 drives only a fixed amount of current, the additional sourced or sunk current IC will flow into or be drawn from a load connected at common current node 48.

Current switch 96 includes two pairs of switches SC', SD' and operates in a manner similar to current switch 94, selectively connecting both of the interface wires 34', 36' to either the current source 98 or to the current sink 100. However, as indicated in the figure, switch 96 is connected in a complementary manner. When switches SC' are closed, the interface 34', 36' is connected to the current sink 100 and when switches SD' are closed, the interface 34', 36' is connected to the current source 98. The additional sourced or sunk current/I will flow into or be drawn from a load connected at node 48'.

Nodes 48 and 48' are connected to each other by a resistive load, such as resistors 102 and 104. Current switches 94 and 96 are operated synchronously with each other such that when switch 94 is sourcing current IC, switch 96 is sinking current IC and visa-versa. In this manner, the injected common mode current IC will flow from one interface and into the other through the connecting resistive load. By controlling the direction of the common mode currentflow, common mode data can be transmitted over the interface without disturbing the differentially transmitted data signal. The common mode transmitted data signal can be extracted by measuring the voltage difference between nodes 48 and 48'.

As illustrated, the interfaces 34, 36 and 34', 36' may be locally terminated by a resistance 90 and furthermore, the two interfaces may be connected to each other via a local resistance, such as resistors 106, 108. Although such a local connection is not necessary, it may be useful to help balance the interfaces. It should be noted that if the interfaces are locally connected, a remote connection (i.e., via resistors 102 and 104) is not required since the current IC can still flow between the interfaces. The voltage drop across the local connection will be distributed across the interfaces and can be detectable at the receiving end.

It can be appreciated that in this embodiment, the common mode data signal is transmitted as a first common mode current in interface 34, 36 and a second common mode current in interface 34', 36' which flows in the opposite direction from the first common mode current and so the common mode data signal is transmitted in a differential manner. Accordingly, this circuit provides for three differentially transmitted data signals to be transmitted over two differential interface pairs.

Figure 8:
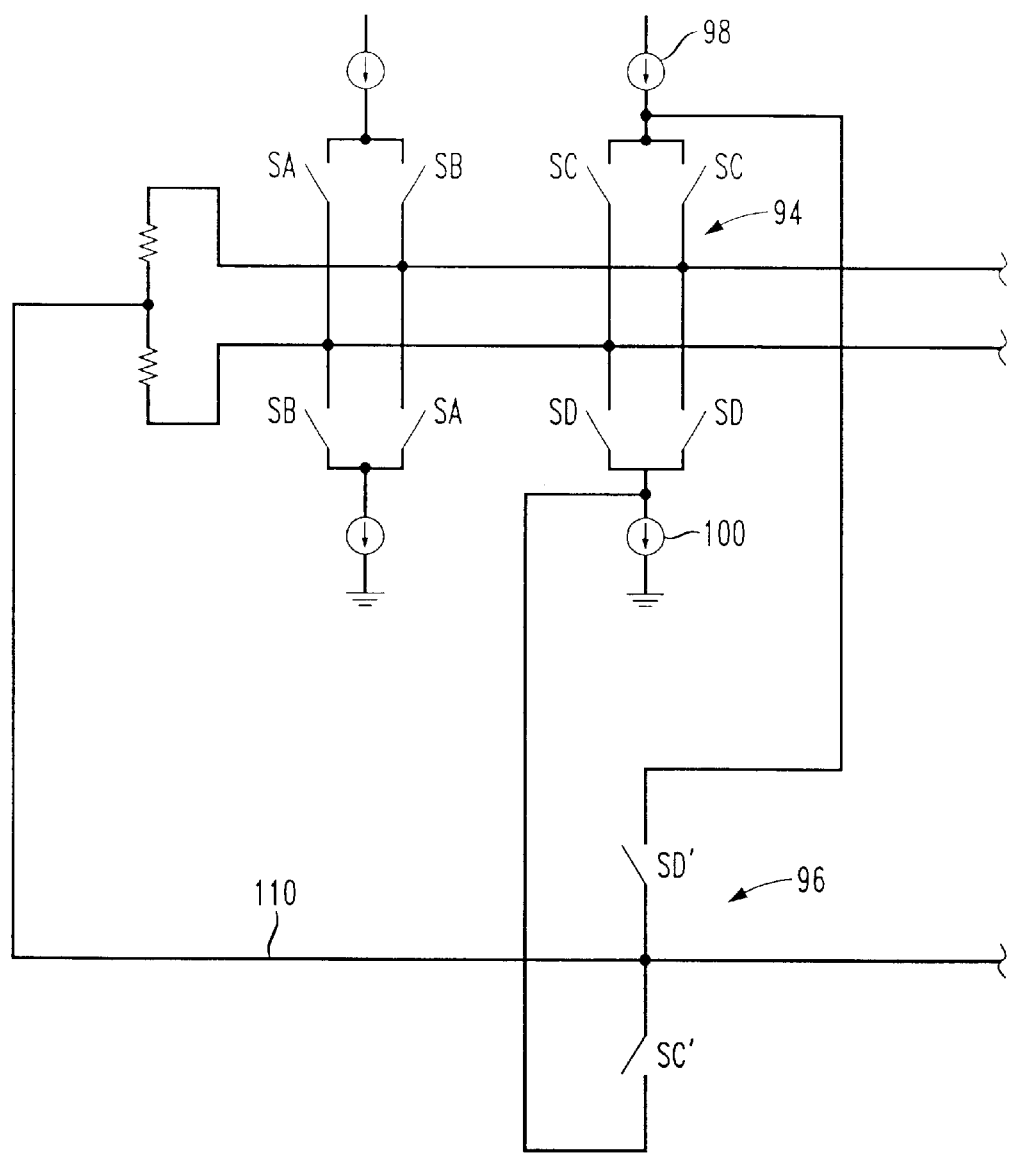
FIG. 8 is a circuit diagram of an alternative differential and common mode data transmitter according to the invention utilizing a three-wire interface.

FIG. 8 illustrates a variation of the circuit shown in FIG. 7, utilizing a three-wire interface in a manner similar to that shown in FIG. 6. In such an embodiment, interface wires 34', 36' are replaced by a single wire 110 and the corresponding common mode current switch 96 comprises only a single switch pair which selectively connects the wire 110 to either the current source 98 or current sink 100 according to the transmitted common mode current signal.

While the invention has been particularly shown and described with reference to preferred embodiments thereof, it will be understood by those skilled in the art that various changes in form and details may be made therein without departing from the spirit and scope of the invention. For example, while the disclosed circuits are discussed with respect to two-level digital data signals, the circuits may be modified so as to transmit and receive multi-level digital signals containing more than one bit of information.

I claim:

1. A method of transferring digital data, comprising the steps of:

switching a first differential signal between a plurality of discrete values to communicate a first digital data signal;

switching a first common mode signal between a plurality of discrete values to communicate a second digital data signal; and providing the first differential signal and the first common mode signal on first and second signal paths;

switching a second differential signal between a plurality of discrete values to communicate a third digital data signal; switching a second common mode signal between a plurality of discrete value in opposition to the switched value of the first common mode signal, thereby communicating said second digital data signal as a differential signal having as differential signal components said first and second common mode signal levels; and providing the second differential signal and the second common mode signal on third and fourth signal paths.

2. The method of claim 1, further comprising the steps of:

providing a signal value on a third signal path; and switching the signal value on said third signal path conversely with respect to the value of said first common mode signal level, thereby communicating a second data signal as a differential signal defined by said first common mode signal value and the signal value on said third signal path.

3. The method of claim 1, further comprising the step of:

altering the magnitude of said first and second common mode signal values by a plurality of predefined amounts in response to a fourth digital data signal, said first and second common mode signal values being altered in the same manner.

4. A circuit for transmitting digital data comprising:

first and second interface nodes;

a differential switching circuit generating first and second differential signal components at said first and second interface nodes, respectively, in response to a first digital signal, the difference between laid first and second differential signal components indicating the value of said first digital signal;

a common mode injection circuit connected to said first and second interface nodes and injecting a common mode signal at said first and second interface nodes in response to a second digital signal, said injected common mode signal affecting said first and second differential signal components to substantially the same degree.

5. The circuit of claim 4, wherein said differential switching circuit comprises a current switch.

6. The circuit of claim 4, wherein said common mode injection circuit comprises a first resistance connected between said first interface node and an injection node and a second resistance connected between said injection node and said second interface node, said common mode signal being injected at said injection node.

7. The circuit of claim 4 wherein said injected common mode signal is a switched voltage having a magnitude dependent on said second digital data signal.

8. The circuit of claim 4, wherein said injected common mode signal is a switched current having a magnitude dependant on said second digital data signal.

9. A circuit for transmitting a first digital signal and for transmitting and receiving a second digital signal between first and second interface nodes, the circuit comprising:

a differential switching circuit generating first and second differential signal components at said first and second interface nodes, respectively, in response to said first digital signal, the difference between said first and second differential signal components indicating the value of said first digital signal; and a common mode injection and extraction circuit connected to said first and second interface nodes and having transmit and receive states, when in a transmit state, said injection and extraction circuit injecting a common mode signal into said first and second differential signals in response to said second digital signal, said injection and extraction circuit extracting from said first and second differential signals a common mode signal injected onto said first and second differential signals when in a receive state, whereby said injected common mode signal affects said first and second differential signal components to substantially the same degree.

10. The circuit of claim 9, wherein said differential switching circuit comprises a current switch.

11. The circuit of claim 9, wherein said common mode injection and extraction circuit comprises:

a first resistance connected between said first interface node and a common mode access node;

a second resistance connected between said access node and said second interface node;

an injection circuit connected to said access node for injecting said common mode signal when in the transmit state and disconnected from said access node when in the receive state; and said common mode signal being extracted from said access node.

12. In an integrated circuit, a circuit for receiving on first and second interface nodes, a first digital signal transmitted as first and second differential signal components and a second digital signal transmitted as a common mode signal carried by said differential signal components, said circuit comprising:

a differential receiver connected to said first and second interface nodes for extracting said first digital data signal; and a common mode extraction circuit connected to said first and second interface nodes for extracting said common mode signal; wherein:

said first digital signal is generated using differential current signaling;

said common mode extraction circuit comprises a first resistance connected between said first interface node and an extraction node and a second resistance connected between said extraction node and said second interface node, said common mode signal representing said second digital signal being extracted from said extraction node; and said differential receiver having inputs connected to said first and second interface nodes and being differentially responsive thereto to produce an output representative of said first digital signal.

13. A circuit for receiving a first digital signal transmitted as first and second differential signal components and for receiving and transmitting a second digital signal transmitted as a common mode signal carried by said differential signal components, said circuit comprising:

an interface having first and second interface nodes receiving said first and second differential signal components;

a differential receiver connected to said first and second interface nodes and extracting said first digital data signal;

a common mode injection and extraction circuit connected to said first and second interface nodes and having transmit and receive states, said injection and extraction circuit extracting a common mode signal carried by said first and second differential signals when in a receive state, said injection and extraction circuit injecting a common mode signal into said interface in response to said second digital signal when in a transmit state, said injected common mode signal affecting said first and second differential signal components to substantially the same degree.

14. The circuit of claim 13, wherein said common mode injection and extraction circuit comprises:

a first resistance connected between said first interface node and a common mode access node;

a second resistance connected between said access node and said second interface node;

an injection circuit connected to said access node for injecting said common mode signal when in the transmit state and disconnected from said access node when in the receive state; and said common mode signal being extracted from said access node.

15. A system for transmitting and receiving first and second digital data signals over an interface having first and second ends, said system comprising:

a differential switching circuit connected to the first end of said interface and generating first and second differential signal components in response to a first digital signal, the difference between said first and second differential signal components indicating the value of said first digital data signal;

a differential receiver connected to the second end of said interface and determining the value of said first digital data signal in accordance with the difference between received first and second differential signal components;

a common mode injection circuit connected to one of said first and second ends and injecting a common mode signal into said interface, said injected common mode signal affecting said first and second differential signal components to substantially the same degree; and a common mode extraction circuit connected to the other of said first and a second ends for extracting said common mode signal.

16. The system of claim 15, wherein said common mode injection circuit is connected to said differential switching circuit and said common mode extraction circuit is connected to said differential receiver.

17. A circuit for transmitting first and second digital data signals over an interface comprising:

a first output stage having first and second output nodes and comprising a differential switching circuit and a common mode injection circuit;

said differential switching circuit generating first and second differential signal components in response to said first digital signal, the difference between said first and second differential signal components indicating the value of said first digital signal, said first and second differential signal components being connected to said first and second output nodes, respectively;

said common mode injection circuit being connected to said first and second output nodes and providing a common mode signal for injection into said first and second differential signals in accordance with an input signal, said injected common mode signal affecting said first and second differential signal components to substantially the same degree;

a common mode signal generator generating first and second complementary common mode signals in response to said second digital signal, said first common mode signal being provided as said input to said common mode injection circuit, said second common mode signal being connected to a third output node.

18. The circuit of claim 17, wherein said differential switching circuit comprises a current switch.

19. The circuit of claim 17, wherein said common mode injection circuit comprises a first resistance connected between said first output node and an injection node and a second resistance connected between said injection node and said second output node, said common mode signal being injected at said injection node.

20. The circuit of claim 17, wherein said common mode signal generator comprises:

a first switch connecting said first common mode signal to a first voltage when said second digital signal is high and to a second voltage when said second digital signal is low; and a second switch connecting said second common mode signal to said first voltage when said second digital signal is low and to said second voltage when said second digital signal is high.

21. The circuit of claim 17, wherein said common mode signal generator comprises:

a second output stage generating third and fourth differential signal components in response to said second digital signal;

said third differential signal serving as said first common mode signal connected to said common mode injection circuit;

said fourth differential signal serving as said second common mode signal connected to said third output node.

22. The circuit of claim 17, wherein said interface comprises three wires aligned along a common axis, each of said wires having a substantially constant displacement from said common axis.

23. A circuit for transmitting a plurality of digital data signals comprising:

first and second output stages, each having at least two output nodes and comprising a differential switching circuit and a common mode injection circuit;

said differential switching circuit connected to said respective output nodes and generating a pair of differential signal components in response to a first and second digital signals, respectively, the difference between said differential signal components indicating the value of said respective first or second digital signal;

a common mode injection circuit connected to said respective output nodes in parallel with said differential switching circuit and injecting a common mode signal into said pair of differential signals in response to an input signal, said injected common mode signal affecting said differential signal components to substantially the same degree;

a common mode signal generator generating complementary first and second common mode signals in response to a third digital signal;

said first common mode signal being applied as the input to the common mode injection circuit in said first output stage, and said second common mode signal being applied as the input to the common mode injection circuit in said second output stage.

24. The circuit of claim 23, wherein said differential switching circuit comprises a current switch.

25. The circuit of claim 23, wherein said common mode injection circuit comprises a first resistance connected between said one of said output nodes in a respective output stage and an injection node, and a second resistance connected between said injection node and another of said output nodes in said respective output stage, said applied common mode signal being injected at said injection node.

26. The circuit of claim 23, wherein said common mode signal generator comprises:

a first switch connecting said first common mode signal to a first voltage when said third digital signal is high and to a second voltage when said third digital signal is low; and a second switch connecting said second common mode signal to said first voltage when said third digital signal is low and to said second voltage when said third digital signal is high.

27. The circuit of claim 23 wherein said common mode signal generator comprises, a third output stage generating a third pair of differential signal components in response to said third digital signal;

one of said third pair of differential signal components serving as said first common mode signal applied as the input to the common mode injection circuit in said first output stage;

the other of said third pair of differential signal components serving as said second common mode signal applied as the input to the common mode injection circuit in said second output stage.

28. The circuit of claim 27, wherein said third output stage generates a third common mode signal in response to a fourth data signal applied as input to the common mode injection circuit in the third output stage.

29. The circuit of claim 23, wherein said interface comprises four wires aligned along a common axis, each of said wires having a substantially constant displacement from said common axis.

30. A system for transmitting a plurality of digital data comprising:

first and second output nodes;

a first differential switching circuit connected to said first and second output nodes, said first differential switching circuit connecting said first output to a first current source and said second output to a first current sink in a first differential output state and connecting said first output to said first current sink and said second output to said first current source in a second differential output state;

a first common mode switching circuit connected to said first and second output nodes, said first common mode switching circuit connecting said first and second output nodes to a second current source in a first common mode output state and connecting said first and second output nodes to a second current sink in a second common mode output state;

a third output node;

a second common mode switching circuit connected to said third output node, said second common mode switching circuit connecting said third output node to said second current sink in said first common mode output state and connecting said third output node to said second current source in said second common mode output state;

a common current node;

a first resistance connected between said first output node and said common current node;

a second resistance connected between said common current node and said second output node;

said common current node being electrically connected to said third output node.

31. The system of claim 30, further comprising:

a fourth output node;

said second common mode switching circuit being connected to said third output node and connecting said fourth output node to said second current sink in said first common mode output state and connecting said fourth output node to said second current source in said second common mode output state;

a third resistance connecting said common current node to said third output node; and a fourth resistance connecting said common current node to said fourth output node.

* * * * *